US009661470B1

(12) United States Patent
Du Bois et al.

(10) Patent No.: US 9,661,470 B1
(45) Date of Patent: May 23, 2017

(54) METHODS AND SYSTEMS FOR LOCATING AN ACTOR WITHIN AN ENVIRONMENT

(71) Applicant: Google Inc., Mountain View, CA (US)

(72) Inventors: Paul Du Bois, Mountain View, CA (US); Greg Joseph Klein, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/875,065

(22) Filed: Oct. 5, 2015

(51) Int. Cl.
*H04W 24/00* (2009.01)
*H04W 4/02* (2009.01)
*H04W 12/08* (2009.01)

(52) U.S. Cl.
CPC .......... *H04W 4/027* (2013.01); *H04W 12/08* (2013.01)

(58) Field of Classification Search
CPC .............................. H04W 4/027; H04W 12/08
USPC ............ 455/404.2, 418–422.1, 412.1–414.2, 455/456.1, 456.2, 457, 552.1, 41.1–41.2, 455/550.1, 566; 340/572.1, 572.4, 539.1, 340/539.13, 825.49; 370/328, 338
See application file for complete search history.

(56) References Cited

U.S. PATENT DOCUMENTS

| | | | | |
|---|---|---|---|---|
| 7,532,113 B2* | 5/2009 | Horvitz | ................ | G01C 21/206 340/539.13 |
| 7,598,865 B2* | 10/2009 | Zhang | .................. | G01S 13/876 340/10.1 |
| 7,679,561 B2* | 3/2010 | Elwell, Jr. | ............ | G01C 21/206 342/453 |
| 8,320,939 B1* | 11/2012 | Vincent | .................. | G01S 19/48 370/338 |
| 8,386,422 B1* | 2/2013 | Kadous | ................ | G01C 21/206 455/456.1 |
| 8,849,867 B1* | 9/2014 | Pilloff | ................ | G01C 21/3632 707/802 |
| 2004/0153671 A1* | 8/2004 | Schuyler | ............. | G07C 9/00111 726/9 |
| 2005/0143091 A1* | 6/2005 | Shapira | ................. | H04W 64/00 455/456.1 |
| 2009/0102719 A1* | 4/2009 | Lin | ........................ | G01S 5/0252 342/450 |
| 2012/0212567 A1* | 8/2012 | Brooksby | .............. | H04M 11/08 348/14.01 |
| 2014/0114493 A1* | 4/2014 | Tsukamoto | ............... | G05F 1/66 700/295 |

(Continued)

*Primary Examiner* — Babar Sarwar
(74) *Attorney, Agent, or Firm* — McDonnell Boehnen Hulbert & Berghoff LLP

(57) ABSTRACT

Examples methods and systems for locating an actor in an environment are described herein. For example, an information system may receive point cloud data representing a cluster of potential actors at a location in the environment. In addition, the information system may also receive location information from a device indicating that the current location of the device is proximate to the location of the cluster of potential actors. Based on movement information from the device that indicates movements of the device, the information system may determine a portion of the point cloud data that displays movements that matches the movement of the device. Using the determined portion of the point cloud, the information system may identify a particular actor of the cluster that corresponds to the device and provide an output signal indicating that the determined portion of the point cloud represents the identified particular actor.

20 Claims, 9 Drawing Sheets

(56) References Cited

U.S. PATENT DOCUMENTS

2016/0073229 A1* 3/2016 Haro .................... H04W 4/021
455/456.3

* cited by examiner

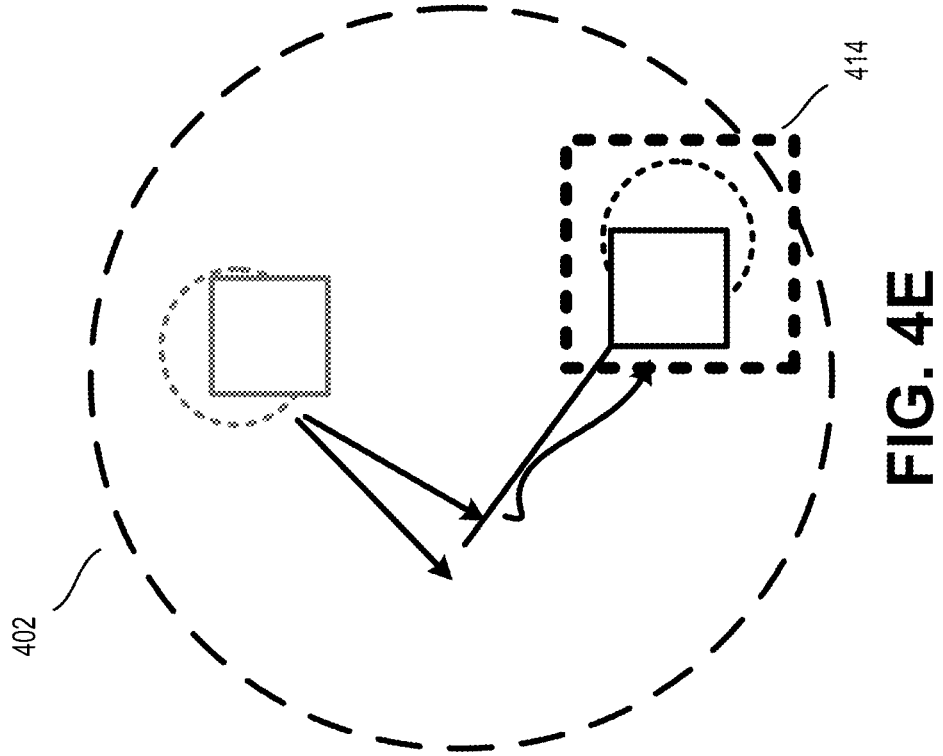

METHODS AND SYSTEMS FOR LOCATING AN ACTOR WITHIN AN ENVIRONMENT

BACKGROUND

Physical spaces may be used for retail, manufacturing, assembly, distribution, and office spaces, among others. Over time, the manner in which these physical spaces are designed and operated is becoming more intelligent, more efficient, and more intuitive. As technology becomes increasingly prevalent in numerous aspects of modern life, the use of technology to enhance these physical spaces becomes apparent. Therefore, a demand for such systems has helped open up a field of innovation in sensing techniques, data processing, as well as software and user interface design.

SUMMARY

Example implementations relate to methods and systems for locating an actor within an environment. An information system (e.g., one or more computing systems) may receive sensor data, such as depth sensor data, from sensors operating in an environment containing measurements of the environment. In some instances, the depth sensor data may indicate that a cluster of potential actors is located within the environment. In order to identify particular actors within the cluster, the information system may receive additional information (e.g., movement information) from one or more devices, such as smartphones and/or wearable computing devices operating in the environment. As such, the information system may use the movement information from a given device sharing a location with the cluster of potential actors to determine a portion of the depth sensor data that expresses movement by an object and/or potential actor that matches the movement of the given device. Using the determined portion of the depth sensor data, the information system may identify a particular actor out of the cluster of potential actors that is moving in a manner that matches the movements of the device and output a signal indicating that the portion of the depth data corresponds to the identified actor.

In one aspect, a method is provided. The method may include receiving, at a computing system from at least one depth sensor, point cloud data representative of a cluster of one or more potential actors at a location in an environment. The method may also include receiving, at the computing system, location information from a device, and determining that a current location of the device is proximate to the location of the cluster of one or more potential actors based on the location information from the device. The method may also include receiving, at the computing system from the device, movement information indicative of movement of the device, and based on the movement information, determining a portion of the point cloud data indicative of movement that matches the movement of the device. The method may further include identifying, using the determined portion of the point cloud data, a particular actor of the cluster of one or more potential actors that corresponds to the device. In particular, in some instances, the device is physically coupled to the particular actor. Additionally, the method may include providing an output signal indicating the portion of the point cloud data representative the identified particular actor.

In another aspect, a system is provided. The system may include one or more processors, and a non-transitory computer-readable medium, configured to store instructions, that when executed by the one or more processors, cause the one or more processors to perform functions. The functions may include receiving, from at least one depth sensor, point cloud data representative of a cluster of one or more potential actors at a location in an environment. The functions may also include receiving location information from a device, and determining that a current location of the device is proximate to the location of the cluster of one or more potential actors based on the location information from the device. The functions may also include receiving, from the device, movement information indicative of movement of the device, and based on the movement information, determining a portion of the point cloud data indicative of movement that matches the movement of the device. In addition, the functions may include identifying, using the determined portion of the point cloud data, a particular actor of the cluster of one or more potential actors that corresponds to the device. In some instances, the device is physically coupled to the particular actor. The functions may also include providing an output signal indicating the portion of the point cloud data representative the identified particular actor.

In yet another aspect, a non-transitory computer-readable medium configured to store instructions, that when executed by one or more processors, cause a computing system to perform functions. The functions may include receiving, from at least one depth sensor, point cloud data representative of a cluster of one or more potential actors at a location in an environment, and receiving location information from a device. The functions may further include determining that a current location of the device is proximate to the location of the cluster of one or more potential actors based on the location information from the device. The functions may also include receiving, from the device, movement information indicative of movement of the device, and based on the movement information, determining a portion of the point cloud data indicative of movement that matches the movement of the device. The functions may also include identifying, using the determined portion of the point cloud data, a particular actor of the cluster of one or more potential actors that corresponds to the device. In some instances, the device is physically coupled to the particular actor. Additionally, the functions may also include providing an output signal indicating the portion of the point cloud data representative the identified particular actor.

In an additional aspect, a system comprising means for measuring aspects of the environment is provided. The system may include means for receiving, from at least one depth sensor, point cloud data representative of a cluster of one or more potential actors at a location in an environment, and means for receiving location information from a device. The system may further include means for determining that a current location of the device is proximate to the location of the cluster of one or more potential actors based on the location information from the device, and means for receiving, from the device, movement information indicative of movement of the device. The system may also include means for, based on the movement information, determining a portion of the point cloud data indicative of movement that matches the movement of the device, and means for identifying, using the determined portion of the point cloud data, a particular actor of the cluster of one or more potential actors that corresponds to the device. In some instances, the device is physically coupled to the particular actor. Additionally, the system may include means for providing an output signal indicating the portion of the point cloud data representative the identified particular actor.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIG. 4E illustrates the information determining a portion of the point cloud data that likely corresponds to a particular actor using the device, according to the example implementation.

DETAILED DESCRIPTION

Figure 1:
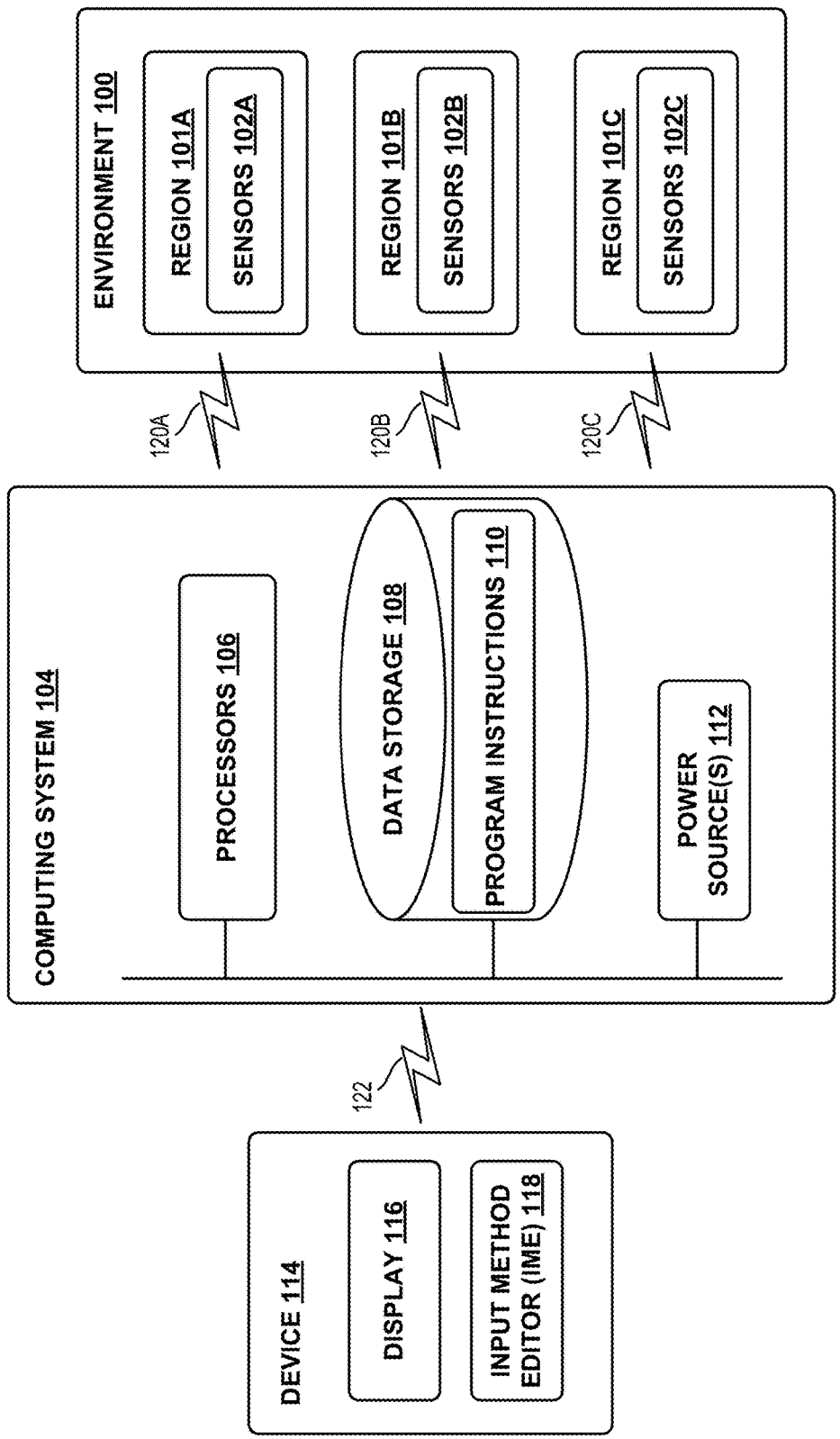
FIG. 1 depicts a configuration of an information system, according to an example implementation.

In the following detailed description, reference is made to the accompanying figures, which form a part hereof. In the figures, similar symbols typically identify similar components, unless context dictates otherwise. The illustrative implementations described in the detailed description, figures, and claims are not meant to be limiting. Other implementations may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Example implementations of the present disclosure relate to methods and systems for locating an actor within an environment. Within examples, an information system (e.g., one or more computing systems) may utilize measurements captured within sensor data by various types of sensors operating in an environment and process the measurements to determine aspects of the environment. For instance, an information system may use incoming sensor data to locate and recognize objects and actors as well as also measure movements of the objects and actors throughout the environment. The information system may further associate incoming sensor data with the particular times that the measurements were captured by sensors and/or received at the information system, for example. As such, the information system may acquire and utilize various types of sensor data, such as depth sensor data (e.g., point clouds) from laser-based sensors and/or camera systems that indicate the positions of nearby surfaces of objects and actors. For examples purposes, an actor may be a person, robotic device, and/or other entity that the information system is configured to locate and measure its corresponding movements.

As indicated above, an information system may process incoming sensor data to measure various aspects of an environment. For instance, an information system may measure the location and movements of actors within the environment in order to develop and provide instructions to one or more systems operating within the environment that may enhance the experience of the actors. By way of an example, the information system may provide instructions to robotic actors operating in the environment in order to improve the efficiency of operations by the robotic actors and increase overall safety within the environment by developing movement instructions for the robotic actors that helps prevent collisions and other unwanted operations. In some instances, the information system may utilize incoming sensor data to develop instructions for enabling audio and/or visual systems to provide specific outputs only in areas of the environment when an identified actor is located within the areas. By extension, the information system may use measurements within sensor data to measure other aspects of the environment, including causing systems to adjust other aspects of the area depending on the position and motions of identified actors throughout the environment.

An example information system, in some examples, may receive point cloud data (e.g., one or more point clouds made up of data points) that indicate the presence of a cluster of potential actors within the environment, but lacking detailed enough measurements that enable the information system to identify individual actors within the cluster. In particular, a variety of parameters associated with obtaining and processing point cloud data, such as the quality of the sensors, latency of transmission, noise within the data, and/or other possible factors (e.g., overlapping positions of the actors in the cluster) may prevent and/or limit to the ability of the information system to differentiate among and identify particular actors within the cluster of potential actors. To overcome noise and/or other possible factors that may limit the information system from identifying individual actors within the point cloud data, the information system may perform operations described herein. In some instances, the information system may use similar methods and/or operations to identify particular actors within depth sensor data (e.g., point cloud data). For example, the information system may use additional sensor data received from the same and/or different sensors directed towards the cluster of potential actors in order to differentiate among actors within the cluster.

In some example implementations, the information system may utilize information provided by one or more devices located in the same area as the cluster of the potential actors to identify particular actors within a cluster of potential actors depicted in point cloud data. In particular, the information system may receive location information from a device that indicates that the device is currently located proximate to the location of the cluster of potential actors. The device transmitting location information to the information system may vary within examples, and may include, but is not limited to, smartphones, wearable computing devices, tablets, badges, and/or other types of devices capable of communicating with the information system. As such, a given device may use one or more techniques for identifying its location in the environment, such as obtaining a location estimate from a global positioning system (GPS) operating on the device and/or using a predicted location developed using a Wi-Fi based positioning system (WPS).

Regardless of how the device determines its location, the device may relay the location information to the information system to enable the location system to determine that the device is positioned proximate to the cluster of potential actors as indicated within the point cloud data.

After determining that a device likely has a current location that corresponds to the location of the cluster of potential actors, the information system may further request the device to transmit movement information indicating current movements of the device to the information system. The movement information provided to the information system from the device may represent any type of information corresponding to movement of the device that may assist the information system in matching the device to a particular actor. For instance, the information system may receive movement information from a device that indicates a rate and/or indications of changes in direction of movement of the device. In some examples, an inertial measurement unit (IMU) of the device may measure movements of the device over a period time in an unknown frame of the device. As such, the information system may receive time indications from the device as well that indicates the period of time associated with the movements of the device.

Upon receiving the movement information from a given device, the information system may use the movement information to identify a portion of the point cloud data displays one or more potential actors moving in a similar manner that matches the movements of the device. In other words, the information system may focus upon a portion of incoming point cloud data representing the cluster of potential actors that likely represents an actor moving in a manner that matches the movements of the device. In some instances, the information system may compare movements of objects and/or actors within the point cloud data during a given period of time to movements of the device during the same period of time to identify the portion of the point cloud data that displays similar movements to the device.

Additionally, the information system may further process the portion of the point cloud to identify a particular actor that corresponds to the device (e.g., an actor that is holding the device) and output a signal indicating that the portion of the point cloud data represents that particular actor. The information system may identify the actor based on the actor moving at the same speed and changes in direction over the same period of time as the device as indicated by movement information provided to the information system by the device. As a result, the information system may associate the particular actor with the device and measure movements of the actor based on receiving subsequent movement information from the device. In some instances, the information system may perform the above process and/or similar processes to assist in segmentation of incoming point cloud data. In particular, the information system may use the processes to figure out which points within point cloud data corresponds to a particular actor based on the actor's movements.

For illustration purposes, an example information system may represent any type of computing system or computing devices configured to receive and process sensor data corresponding to the environment from different types of sensors. For instance, the information system may include one or more processors configured to receive sensor data from sensors, including, but not limited to laser-based sensors (e.g., LIDAR, RADAR), stereo camera systems, microphones, tactile sensors, and environment sensors, among other types of sensors. An information system may utilize a clock that enables the information system to time stamp incoming sensor data and information (e.g., information from devices in the environment) in order to align information from different sensors or devices that correspond to the same period of time.

Referring now to the figures, FIG. 1 depicts a configuration of an information system, according to an example implementation. The example information system may be configured to analyze aspects of environment 100, which may involve focusing upon sensor data corresponding to particular regions (e.g., region 101A, region 101B, and region 101C) provided by one or more sensors positioned in the respective regions, such as sensors 102A, sensors 102B, and sensors 102C. In the example implementation, the information system is shown having a computing system 104 configured with one or more processors 106, data storage 108 storing program instructions 110, and power source(s) 112.

Additionally, the information system may further operate and/or communicate with device 114 equipped display 116 and input method editor (IME) 118. For example, device 114 may operate separately from the information system and communicate via a wireless communication connection. As such, the example configuration of the information system shown in FIG. 1 is for illustration purposes and may include more or less components arranged in other configurations within other example implementations.

The information system may analyze aspects of environment 100, which may involve dividing environment 100 to focus upon particular regions (e.g., regions 101A-101C). The process of analyzing environment 100 based on regions may enable the computing system 104 of the information system to analyze particular areas of the environment more in depth or to prioritize resources upon certain regions. In some cases, the information system may divide environment 100 into regions, such as regions 101A-101C, based on positions of sensors and/or other possible factors. For example, the information system may focus upon a particular region based on receiving an indication within sensor data that a cluster of potential actors is located within the region. The information system is shown analyzing environment 100 as regions 101A-101C, but may be divide environment 100 into other region configurations (e.g., dynamically adjust the size, quantity, or other parameters of the regions). For example, the information system may combine region 101A and region 101B into a single region during some analysis. In addition, regions 101A-101C may have uniform sizes (e.g., two-dimensional area or three-dimensional cube) or vary in sizes. A region (e.g., region 101A) may represent a portion of the environment in which actors (e.g., people, robotic devices), objects, and/or machines may be located.

In addition, while various aspects of the disclosure are discussed below in the context of a general environment 100 (i.e., a general space), example implementations are not limited to general environment 100 and may extend to a variety of other environments such as retail spaces, manufacturing facilities, distribution facilities, office spaces, shopping centers, festival grounds, and/or airports, among other examples. For example, environment 100 may correspond to a manufacturing facility and the actors positioned within the different regions of environment 100 may correspond to vehicles, robotic devices, and/or operators.

Regions 101A-101C are shown each having sensors 102A-102C, which may correspond to various types of sensors configured to capture measurements of aspects of the different regions. For instance, sensor 102A may represent one or more laser-based sensors (e.g., LIDAR) and one or more cameras (e.g., a stereo camera system). The different sensors may communicate via wired or wireless connections with the information system and may receive calibration, operation and/or other instructions from the information system. Example sensors 102A-102C may include but are not limited to certain motion-capture (Mocap) sensors, or Velodyne LiDAR sensors, generic force sensors, proximity sensors, motion sensors (e.g., an inertial measurement units (IMU), gyroscopes, and/or accelerometers), load sensors, position sensors, thermal imaging sensors, facial recognition sensors, depth sensors (e.g., RGB-D, laser, structured-light, and/or a time-of-flight camera), point cloud sensors, ultrasonic range sensors, infrared sensors, Global Positioning System (GPS) receivers, sonar, optical sensors, biosensors, Radio Frequency identification (RFID) systems, Near Field Communication (NFC) chip, wireless sensors, compasses, smoke sensors, light sensors, radio sensors, microphones, speakers, radars, touch sensors (e.g., capacitive sensors), cameras (e.g., color cameras, grayscale cameras, and/or infrared cameras), and/or range sensors (e.g., ultrasonic and/or infrared), among others.

The information system may receive sensor data in various forms, such as depth sensor data in the form of point cloud data made up of data points in some coordinate system that represent surfaces of nearby objects in environment 100. When the information system receives incoming sensor data, the information system may associate the incoming data with the given time range that the sensors captured the measurements within the sensor data and/or with the given time that the sensor data arrived at the information system, for example. As such, the information system may receive point cloud data from a LIDAR system and use the measurements to determine the positions of objects in environment 100 as well as for object recognition, for example. The information system may analyze the structure of objects based on patterns of the data points in the received point clouds.

Generally, LIDAR is an optical remote sensing technology that can measure distance to, or other properties of, a target by illuminating the target with light. As an example, a LIDAR unit may include a laser source and/or laser scanner configured to emit laser pulses and a detector configured to receive reflections of the laser pulses. For example, a LIDAR unit may include a laser range finder reflected by a rotating mirror, and the laser is scanned around a scene being digitized, in one or two dimensions, gathering distance measurements at specified angle intervals. In examples, a LIDAR unit may include components such as light (e.g., laser) source, scanner and optics, photo-detector and receiver electronics, and position and navigation system.

In an example, a LIDAR unit may be configured to use ultraviolet (UV), visible, or infrared light to image objects and can be used with a wide range of targets, including non-metallic objects. In one example, a narrow laser beam can be used to map physical features of an object with high resolution. In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit.

In some examples, point cloud data may include a set of vertices in a 3D coordinate system. These vertices may be defined by X, Y, and Z coordinates, for example, and may represent an external surface of an object. The LIDAR units may be configured to create the point cloud by measuring a large number of points on the surface of the object, and may output the point cloud as a data file. As the result of a 3D scanning process of the object by a LIDAR unit, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

Additionally, the example information system is shown having computing system 104 configured to receive sensor data from the sensors 102A-102C via communication links 120A-120C, respectively. Communication links 120A-120C may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11(IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "Wi-Fi" connectivity using 802.11).

In other examples, the arrangement may include access points through which the sensors 102A-102C and/or computing system 104 may communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity by way of the cellular network. Other examples are also possible.

Computing system 104 is shown to include one or more processors 106, data storage 108, program instructions 110, and power source(s) 112. Note that the computing system 104 is shown for illustration purposes only as computing system 104, but may include additional components and/or have one or more components removed without departing from the scope of the disclosure. Further, note that the various components of computing system 104 may be arranged and connected in any manner. Each processor, from the one or more processors 106, may be a general-purpose processor or a special purpose processor (e.g., digital signal processors, application specific integrated circuits, etc.). The processors 106 can be configured to execute computer-readable program instructions 110 that are stored in the data storage 108 and are executable to provide the functionality of the computing system 104 described herein. For instance, the program instructions 110 may be executable to provide for processing of sensor data received from sensors 102A-102C.

The data storage 108 may include or take the form of one or more computer-readable storage media that can be read or accessed by the one or more processors 106. The one or more computer-readable storage media can include volatile and/or non-volatile storage components, such as optical, magnetic, organic or other memory or disc storage, which can be integrated in whole or in part with the one or more processors 106. In some implementations, the data storage 108 can be implemented using a single physical device (e.g., one optical, magnetic, organic or other memory or disc storage unit), while in other implementations, the data storage 108 can be implemented using two or more physical devices. Further, in addition to the computer-readable program instructions 110, the data storage 108 may include additional data such as diagnostic data, among other possibilities. Further, the computing system 104 may also include one or more power source(s) 112 configured to supply power to various components of the computing system 104. Any type of power source may be used such as, for example, a battery.

FIG. 1 further depicts a device 114 that is shown to include a display 116 and an Input Method Editor (IME) 118. The device 114 may take the form of a desktop computer, a laptop, a tablet, a wearable computing device, and/or a mobile phone, among other possibilities. Note that the device 114 is shown for illustration purposes only as device 114 may include additional components and/or have one or more components removed without departing from the scope of the disclosure. Additional components may include processors, data storage, program instructions, and/or power sources, among others (e.g., all (or some) of which may take the same or similar form to components of computing system 104). Further, note that the various components of device 114 may be arranged and connected in any manner.

The device 114 may serve as an interface for interacting with the information system, generally. For instance, the device 114 may enable a user or computing system (e.g., robotic device) to provide inputs to the computing system 104, including requests for the information system to provide various information corresponding to the environment.

In some cases, an example arrangement may not include a separate device 114. That is, various features/components of device 114 and various features/components of computing system 104 can be incorporated within a single system. However, in the arrangement shown in FIG. 1, device 114 may receive data from and/or transmit data to computing system 104 by way of communication link 122. Communication link 122 may take on the same or a similar form to communication links 120A-120C as described above.

Display 116 may take on any form and may be arranged to project images and/or graphics to a user of device 114. In an example arrangement, a projector within device 114 may be configured to project various projections of images and/or graphics onto a surface of a display 116. The display 116 may include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver may be disposed within the device 114 for driving such a matrix display. Other arrangements may also be possible for display 116. As such, display 116 may show a graphical user interface (GUI) that may provide an application through which the user may interact with the systems disclosed herein.

Additionally, the device 114 may receive user-input (e.g., from the user of the device 114) by way of IME 118. In particular, the IME 118 may allow for interaction with the GUI such as for scrolling, providing text, and/or selecting various features of the application, among other possible interactions. The IME 118 may take on various forms. In one example, the IME 118 may be a pointing device such as a computing mouse used for control of the GUI. However, if display 116 is a touch screen display, touch-input can be received (e.g., such as using a finger or a stylus) that allows for control of the GUI. In another example, IME 118 may be a text IME such as a keyboard that provides for selection of numbers, characters and/or symbols to be displayed by way of the GUI. For instance, in the arrangement where display 116 is a touch screen display, portions the display 116 may show the IME 118. Thus, touch-input on the portion of the display 116 including the IME 118 may result in user-input such as selection of specific numbers, characters, and/or symbols to be shown on the GUI by way of display 116. In yet another example, the IME 118 may be a voice IME that receives audio input, such as from a user by way of a microphone of the device 114, that is then interpretable using one of various speech recognition techniques into one or more characters than may be shown by way of display 116. Other examples may also be possible.

In some instances, the information system may communicate with one or more external devices (e.g., device 114) operating in the environment. For example, the information system may communicate with devices, such as tablets, robotic devices, smartphones, wearable computing devices, and servers, among other possible devices. These devices may be held by people (e.g., physically coupled to a person) located in the environment such as consumers and/or employees within a retail space or positioned on a robotic device or vehicle, for example. Additionally or alternatively, these devices may be items on display such as in a retail space used for sale of consumer electronics, for instance.

In examples, the information system may receive measurements from sensors located on the devices. For instance, the information system may receive location information from a given device that indicates the location of the device within the environment. The device may provide location information using a GPS system positioned on the device. Similarly, the device may determine a location of the device using wireless communications with Wi-Fi antennas positioned within the environment.

Furthermore, the information system may also receive movement information from the device that indicates one or more parameters of movement of the device. As an example, a device may include one or more accelerometers, gyroscope and/or other sensors (e.g., IMU unit) within the device provides movement information indicating a velocity, acceleration, direction of travel, or other parameters of movement of the device. When providing information to the information system, a device may relay time information associated with movements and/or locations to the information in addition. In some instances, the device may relay information in real-time to the information system upon establishing a connection with the information system.

Figure 2:
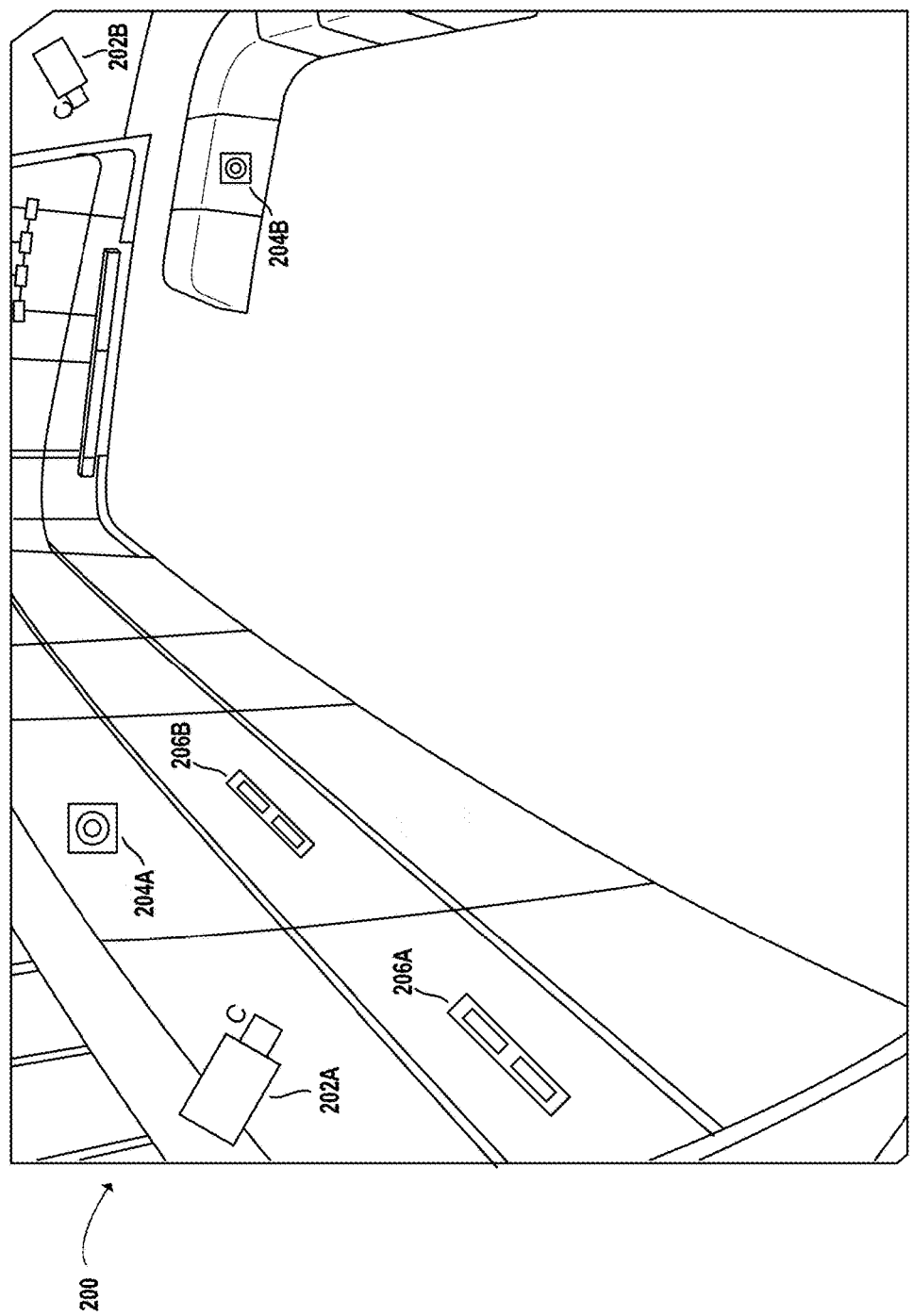
FIG. 2 depicts an environment, according to an example implementation.

FIG. 2 depicts an environment, according to an example implementation. In particular, environment 200 is shown as a general space, but may correspond to other types of indoor or outdoor environments, such as a manufacturing facility, shopping mall, or other possible locations. Environment 200 is shown having various sensors, such as camera 202A, and camera 202B, microphone 204A, microphone 204B, and laser-based sensors 206A, and laser-based sensors 206B, but may include more or less sensors having different positions. The various sensors may facilitate the collection of aspects of the different regions of the environment.

In addition, an example information system may communicate with one or more systems positioned within environment 200 and may further change parameters of sensors operating in environment 200. For instance, the information system may provide instructions to calibrate certain sensors and/or change positions of the sensors. Furthermore, the information system may also communicate with devices that enter into environment 200. For instance, the information system may request and receive information from smartphones, security badges, wearable computing devices, among other possible types of devices.

Figure 3:
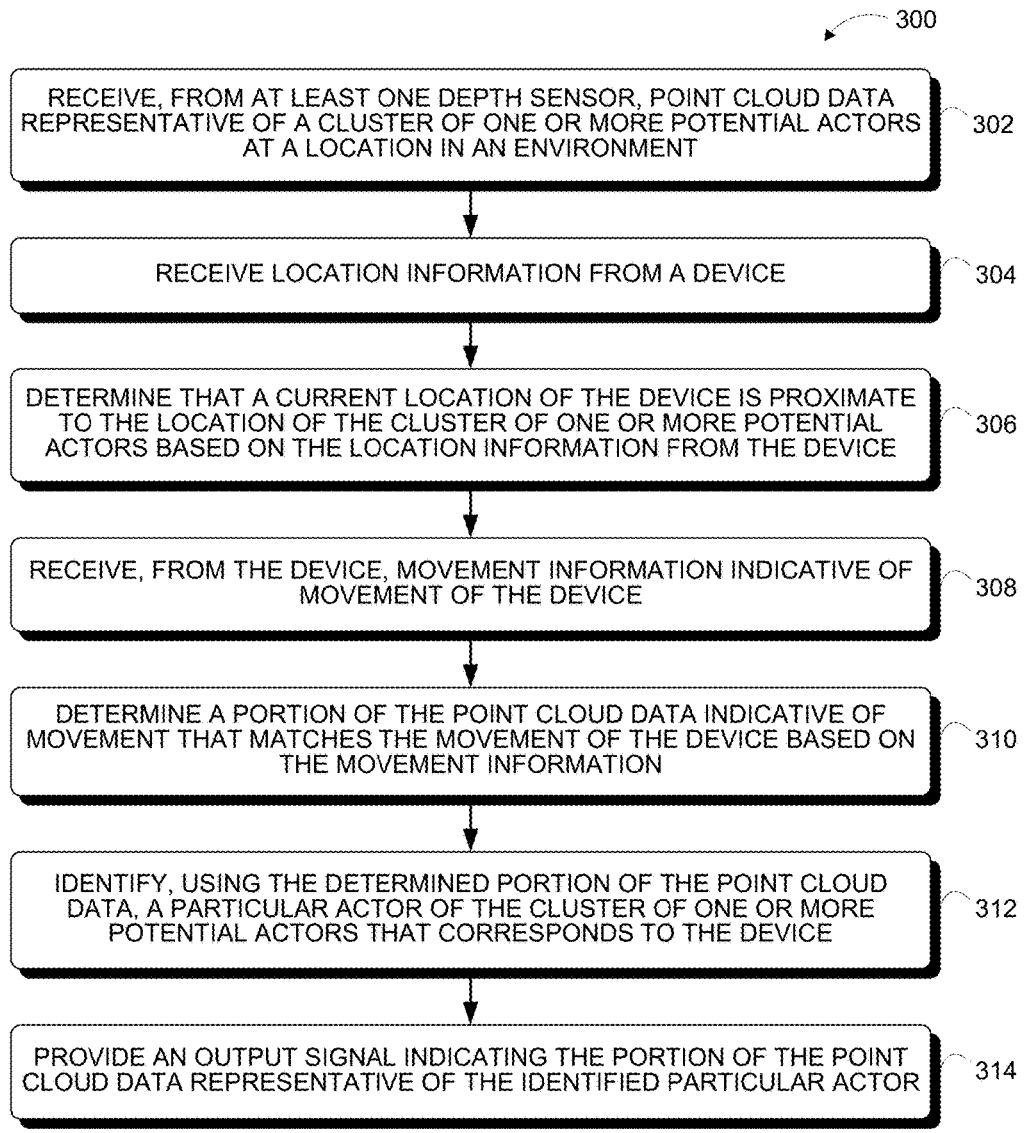
FIG. 3 illustrates a flowchart depicting an example implementation of locating an actor within an environment.

FIG. 3 is a flowchart of example method 300 for locating an actor within an environment. Method 300 represent an example method that may include one or more operations, functions, or actions, as depicted by one or more of blocks 302, 304, 306, 308, 310, 312, and 314 each of which may be carried out by any of the systems described by way of FIG. 1; however, other configurations could be used. Those skilled in the art will understand that the flowchart described herein illustrate functionality and operation of certain implementations of the present disclosure. In this regard, each block of the flowchart may represent a module, a segment, or a portion of program code, which includes one or more instructions executable by a processor (e.g., the one or more processors 106) for implementing specific logical functions or steps in the process. The program code may be stored on any type of computer readable medium, for example, such as a storage device including a disk or hard drive (e.g., data storage 108).

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as would be understood by those reasonably skilled in the art. In examples, an information system may perform one or more blocks of method 300.

Turning to FIG. 3, at block 302, method 300 includes receiving, from at least one depth sensor, point cloud data representative of a cluster of one or more potential actors at a location in an environment. An example information system may analyze information measured in an environment by one or more sensors and use the information to perform various operations, such as object recognition and/or identifying and measuring movements of actors throughout the environment. In some instances, the information system may provide instructions for one or more associated systems operating in the environment to perform in order to enhance the experience of actors within the environment, for example.

The information system may receive sensor data in various formats, which may include receiving depth sensor data in the form of point cloud data from sensors. For example, a LIDAR system operating in the environment may produce point clouds made up of data points (e.g., 60,000 data points) that represent the surfaces of nearby objects. As such, the LIDAR system may include one or more LIDAR units configured to provide point cloud data for the information system. In some instances, the information system may merge point cloud data from multiple LIDAR units to create a merged point cloud that has a higher update rate. For example, using point clouds from multiple LIDAR units publishing at 20 Hz, the information system may generate a merged point cloud at approximately 40 Hz. Likewise, the information system may also process point cloud data individually to detect actors and/or objects within the environment.

Additionally, the information system may receive sensor data from other types of sensors. For instance, a stereo camera system may provide sensor data indicating the positions of objects and/or potential actors in the environment to the information system. In some instances, the camera system (e.g., stereo depth cameras) may provide depth sensor data that enables the information system to locate actors and/or clusters of potential actors in the environment. Similarly, the information system may receive sensor data from directional microphones and/or other types of sensors that enable locating actors and/or clusters of potential actors. The information system may use a combination of sensor data from different types of sensors to measure aspects of the environment. As the information system receives sensor data from one or more sensors, the information system may associate time stamps with the incoming sensor data. The time stamp may represent the time that the sensors executed the measurements within the sensor data and/or the time that the information system received the sensor data, for example.

At block 304, method 300 may include receiving location information from a device. At any given time, a number of computing devices may operate within the environment and separately from the information system. These devices may be in possession of actors and may have the capabilities to communicate information with the information system. Example computing devices include, but are not limited to, smartphones, tablets, computers, and wearable computing devices (e.g., watches, hats), among other possibilities. As such, the information system may communicate with given devices operating in the environment via wireless and/or wired channels and may receive information from the devices, including location information that indicates a given location of a device. In some examples, the information system may receive information from one or more devices in the environment only upon the devices transmitting the information in response to a request from the information system.

As indicated above, the information system may receive and use location information from one or more devices within the environment. A given device may measure its location in various ways. For instance, a device may include a global positioning system (GPS) that is configured to determine the location of the device and enable the device to relay location information to the information system that indicates that the device is currently located within a threshold distance from the location of the cluster of one or more potential actors as indicated within the depth sensor data. Additionally and/or alternatively, a device may measure its location using a Wi-Fi based positioning system (WPS) that may be based on measuring the intensity of the received signal (i.e., received signal strength or RSS) to determine a location of the device. The device may use these techniques as well as other possible techniques to determine a current location of the device to provide to the information system.

In an example implementation, the information system may receive location information from a badge or other component configured to transmit location information to the information system. For instance, the information system may receive location information from a security badge that governs access into regions of an environment. Similarly, the information system may receive location information corresponding to devices from other devices and/or systems operating in the environment. Within incoming information from the one or more devices, the information system may also receive indications of time that the device was located at a given location. In some instances, the information system may receive information from a given device in real-time.

At block 306, method 300 includes determining that a current location of the device is proximate to the location of the cluster of one or more potential actors based on the location information from the device. Using information from a device, the information system may determine that the device is located nearby and/or within the cluster of potential actors detected within the point cloud sensor data. In some examples, the information system may perform a comparison using the location information from the device and the location of the potential actors according to the depth sensor data to determine whether the device is currently located proximate to the cluster of the potential actors. As such, the information system may identify devices having a location that indicates that the device is likely in possession of one of the potential actors positioned within the cluster of potential actors represented in point cloud data. In some examples, the information system may require that a device is within a particular threshold distance from the location of the cluster of potential actors. However, despite the information system locating the device proximate to the cluster of potential actors, the location information from the device may not be precise enough to enable the information system to determine exactly where the device is within the environment and/or within the point cloud data.

In some instances, the information system may utilize a clock that enables comparing location information and other information received from the device to point cloud data. This way, the information system may compare data that corresponds to the same period of time.

At block 308, method 300 may include receiving, from the device, movement information indicative of movement of the device. The information system may receive and use additional information from the device, such as movement information that indicates movement of the device. The movement information may indicate various parameters corresponding to movement of the device, such as a velocity, acceleration, and changes in direction of movement over time of the device. In some example implementations, the information system may receive movement information from an inertial measurement unit (IMU) of the device. In particular, the IMU may measure the velocity, orientation, and gravitational forces on the device, which may involve using a combination of one or more accelerometers, gyroscopes, and/or magnetometers. The information system may further receive indications of time associated with the movements of the device from the device. As such, the information system may determine how long the device moved in a given direction and/or at a given rate, for example. The indications of time from the device may also enable the information system to determine periods of time that the device is at rest (i.e., not moving) as well as when the device changed directions, etc.

At block 310, method 300 may include determining a portion of the point cloud data indicative of movement that matches the movement of the device based on the movement information. Using movement information provided by a given device having a location proximate to the cluster of potential actors, the information system may compare movements expressed within incoming point cloud data to determine a set of data points that displays movement that resembles the movement of the device over the same period of time. In particular, the information system may focus upon a portion of point cloud data (e.g., a set of data points within received point cloud data) depicting one or more detected objects and/or actors moving in a manner that corresponds to the current movements of the device. For instance, the information system may determine that data points within the point cloud data represent a potential actor that is moving in sequences of direction (e.g., changes in direction over time) and/or at the same rate as the device providing information to the information system. The information system may initially detect the portion of the point cloud that represents a potential actor moving similarly to the device, but may require additional analysis of the portion of the point cloud to confirm the presence of the actor.

In an example implementation, the information system may initially analyze the movement information of the device while measuring the location of the device relative to the environment. As such, the information system may determine when a portion of the point cloud data shows objects and/or potential actors moving in a manner that matches the movement of the device during the same range of time. The information system may then check whether the location of the portion that displays the matching movement also corresponds to the location of the device.

In an example implementation, the information system may perform a process to match gait characteristics in order to determine a portion of the point cloud data that may represent a particular actor. For instance, the information system may analyze the walking pattern of an actor in the environment and compare the pattern to patterns of movement provided by the device to figure out if a given device maps to a portion of the point cloud. Similarly, other characteristics associated with the gait of an actor, such as the step rate, changes in direction at given times, and/or other features may assist the information system in identifying a portion of incoming point cloud data that illustrates similar movement information as the movement information from the device at the same approximate time periods. For example, the information system may determine that a portion of the point cloud data depicts one or more potential actors remaining still and moving at particular time periods that match the time periods that a given device remained still and moved at a similar rate.

At block 312, method 300 may include identifying, using the determined portion of the point cloud data, a particular actor of the cluster of one or more potential actors that corresponds to the device. In some instances, the information system may determine that the device is physically coupled to a particular actor (e.g., the actor is holding or wearing the device).

As indicated above, the information system may initially focus upon a portion (e.g., a set of data points) of the incoming point cloud data that represents one or more objects and/or actors moving in a manner that corresponds to the movement of the device during the same time period. After determining the portion of the point cloud data, the information system may further analyze the portion to identify the object and/or actor that is moving in a manner that matches movements of the device during the same time period. As a result, the information system may identify an actor that is likely holding, wearing, and/or otherwise physically coupled to the device.

In some examples, the information system may identify an actor within the cluster of potential actors represented by the point cloud data based on the actor moving with a sequence of changes in directions that matches or similarly resembles a sequence of changes in directions of the device over the same time period. In other words, the information system may recognize that the actor is likely holding onto and/or otherwise in possession of the device (e.g., the device is a smartphone in pocket of the actor) because the device and the identified actor move in sync with similarly timed changes in directions over a given time period.

Similarly, the information system may identify an actor based on point cloud data depicting the actor displaying a rate of movement over a period of time that matches and/or similarly resembles a rate of movement of the device over the same time period. For instance, the information system may associate a probability (e.g., 75 percent) that the device is associated with a particular actor moving in the environment. The information system may adjust the probability based on additional sensor data and information from the device and/or the accuracy of the original identification using the portion of the point cloud data. In other examples, the information system may identify an actor based on the gait of the actor during a given time period resembling movement information of the device over the same time period. For example, the information system may analyze characteristics of the actor's gait over the time period, such as the pattern of up and down movements of steps, length of stride, velocity of stride, etc.

In an example implementation, the information system may determine a rate of movement of at least one actor of the cluster of one or more potential actors using sets of point cloud data and may perform a comparison between the rate of movement of the at least one actor and a rate of movement of the device. The rates of movement may represent the acceleration of the device and/or at least one actor over the same approximate time period. Based on the comparison, the information system may identify the particular actor from the cluster of potential actors that corresponds to the device.

At block 314, method 300 may include providing an output signal indicating the portion of the point cloud data representative the identified particular actor. In particular, the information system may generate an output signal that includes information relating to the identification of the particular actor within the environment. For instance, the information system may develop an output signal that indicates a time and location of the identification of the particular actor. In some examples, the information system may associate the particular actor with the given device that provided information to the information system within the output signal. Furthermore, the information system may further repeat method 300 or similar processes to identify other actors within the originally detected cluster of potential actors. As such, the information system may use information from other devices operating in the environment to identify actors that move in accordance with the other devices. For instance, the information system may generate an output that provides a segmentation of a given scene in the environment that indicates which points within point cloud data corresponds to which actors. As a result, the information system may measure movements of the actors within new sets of point cloud data.

In an example implementation, the information system may provide the output signal and/or developed instructions to one or more systems operating in the environment to adjust aspect(s) of the environment as an identified actor changes location in the environment. For example, the information system may further provide instructions to an audio system to provide audio in locations that corresponds to respective locations of the identified particular actor as the particular actor moves throughout the environment.

In some example implementations, the information system may associate the identified actor to the device. This way, within subsequent sets of sensor data received from the device (e.g., new locations or movement information), the information system may recognize that the movements of the device correspond to movements of the actor. The information system may provide instructions to systems to adjust aspects of the environment based on subsequent changes of the location of the device.

In another example implementation, the information system may also receive location information from a second device and determine that the current location of the second device is proximate to the location of the cluster of one or more potential actors based on the location information from the second device. The information system may further receive movement information indicating movement of the second device and determining that a second portion of the point cloud data us indicative of movement that matches the movement of the second device over the same period of time. As a result, the information system may use the determined second portion of the point cloud data to identify a second actor of the cluster of potential actors that corresponds to the device. In addition, the information system may repeat the process to identify other actors and may provide instructions to systems operating in the environment to perform operations based on the identified actors.

In a further example, the information system may utilize information from multiple devices having locations that correspond to a detected cluster of potential actors. In particular, the information system may identify a first actor based on the movement of the first actor corresponding to movement of a first device and may further identify a second actor based on the movement of the second actor corresponding to movement of the second device. The information system may use time stamps associated within measurements within sensor data and information from the device to assist in identifying the actors associated with the devices. Similarly, the information system may utilize multiple devices to identify multiple actors within other examples.

FIGS. 4A, 4B, 4C, 4D, and 4E illustrate an example implementation of an information system locating an actor within an environment. In particular, the example implementation shown in FIGS. 4A-4E serves as one possible implementation of an information system locating an actor within an environment, but other examples may exist.

Figure 4A:
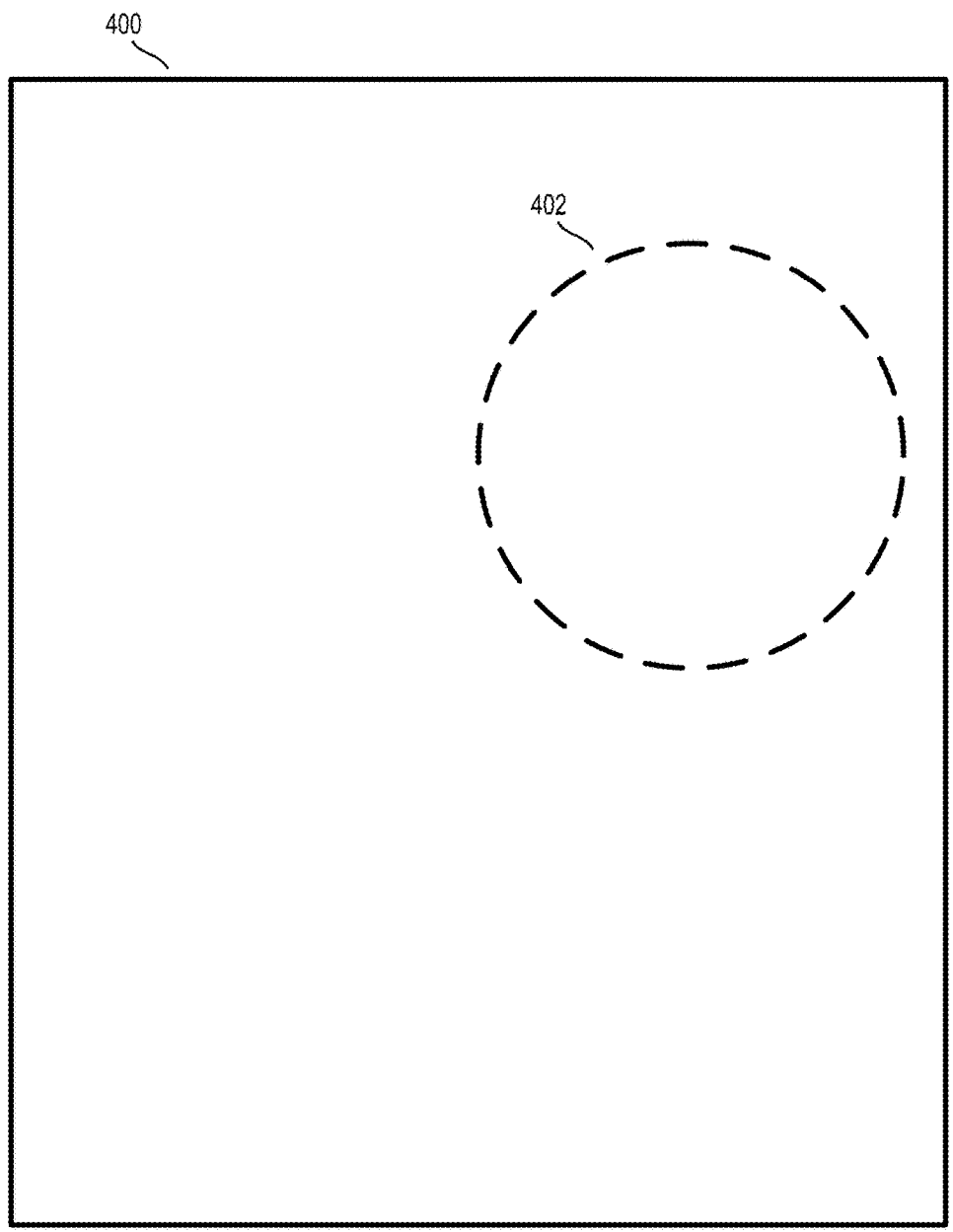
FIG. 4A illustrates an information system determining potential actors of the environment, according to an example implementation.

FIG. 4A illustrates an information system determining potential actors of the environment, according to an example implementation. In particular, FIG. 4A shows an environment 400 having a cluster of potential actors 402 located within environment 400 at a given time. Environment 400 may correspond to various types of spaces, including retail, manufacturing, among other possible environments. As such, an information system may measure aspects of environment 400 by using measurements provided by various sensors (not shown) operating at different locations in environment 400. For example, environment 400 may include one or more LIDAR sensors, RADAR sensors, tactile, temperature, microphones, and/or camera systems, among other possible types of sensors. The configuration and number of sensors within environment 400 may vary within examples.

Among possible types of sensor data, the information system may receive depth sensor data from a camera system and/or laser-based sensors (e.g., LIDAR sensors) that indicates the presence and positions of objects and/or actors within environment 400. In some instances, the sensor data may further indicate the time associated with the sensors capturing the measurements. As such, the information system may receive depth sensor data in the form of point clouds made up of data points representing the positions of the surfaces of objects located in environment 400. The information system may receive point cloud data in a continuous real-time manner and/or other ways from one or more sensors (e.g., incrementally at set periods of time). In some examples, the information system may also receive images, audio, and/or other types of measurements in addition to the point cloud data.

By processing the point clouds and/or other sensor data, the information system may determine that a cluster of potential actors 402 is located approximately in a region of environment 400 during the time of the measurement. In some instances, the point clouds may include measurements that vary in degree of accuracy and/or detail. As the information system receives a given set of point cloud data, the information system may associate the point cloud data with a time period that the point cloud data was received based on a clock of the information system. As a result, the information system may track changes in point cloud data over time, for example.

In some situations, the information system may receive point clouds that provide enough detailed measurements to enable the information system to identify the positions of particular actors in environment 400, including positions of respective actors positioned closely together. However, in other cases, the information system may receive point clouds that provide measurements indicating that a cluster of potential actors is located in an area of environment 400, but not include enough detailed measurements that enable the information system to identify particular actors within the cluster. The point clouds may lack detailed measurements due for various reasons, such as variances in power, noise within the point cloud data, and/or latency or other problems impacting the data during the transmission measurements to the information system. As a result, as shown in FIG. 4A, the information system may determine data points within point cloud data that represents a cluster of potential actors at a given period of time in some instances.

Figure 4B:
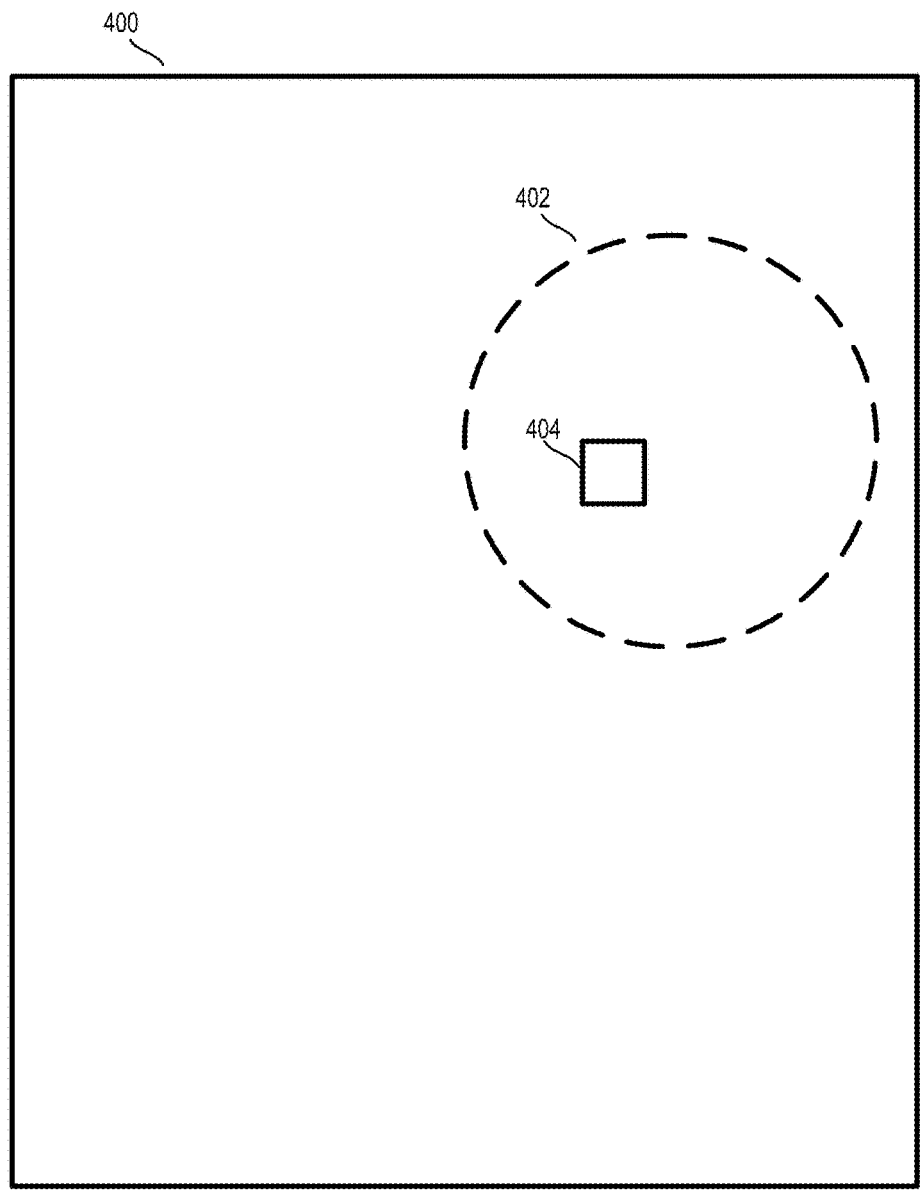
FIG. 4B illustrates the information system receiving information from a device located in the environment, according to the example implementation.

FIG. 4B illustrates the information system receiving information from a device located in the environment, according to the example implementation. The information system measuring aspects of environment 400 may receive request and receive information from one or more devices (e.g., device 404) operating in environment 400. For example, device 404 may operate separately from the information system and may communicate with the information system using various types of wireless communication technology, such as a Wi-Fi connection or other technologies.

In some instances, device 404 may provide location information to the information system. For instance, the information system may transmit a request to the device 404 for location information and receive the information upon device 404 approving the request. The location information may indicate the current position of device 404 as well as other possible information (e.g., recent past locations of device 404). For example, device 404 may transmit time stamps associated with location information indicating location at particular times. As such, the information system may receive the location information from device 404 after sending a request to device 404 and establishing a communication channel with device 404. In other examples, device 404 may transmit the information to the information system without requiring a request from the information system initially. As shown in FIG. 4B, the information system may receive location information from device 404 indicating that device 404 is currently located proximate to the cluster of potential actors 402. In particular, the information system may determine that device 404 is located at a portion of the cluster of potential actors 402 as indicated within the point cloud data.

In some instances, the information system may receive location information from multiple devices. As such, the information system may identify which devices have a current location corresponding to the location of the cluster of potential actors. In such circumstances where a location information is insufficient, the information system may also receive movement information from devices (e.g., device 404) located within environment 400. In particular, the movement information may indicate the rate of movement, detected, and other possible information. The information system may use the movement information to measure movement of the devices within environment 404.

In some examples, the information system may associate a time with incoming information from device 404. In particular, the information system may determine that movement and location information received from device 404 correspond to particular time periods. As such, the information system may be able to compare information from device 404 with other sensor data that correspond to the same periods of time.

Figure 4C:
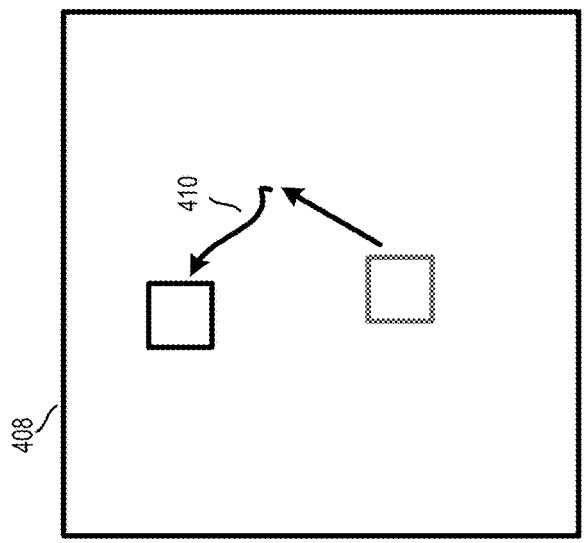
FIG. 4C illustrates the information system determining movement in depth sensor data and from the device, according to the example implementation.
Figure 4C:
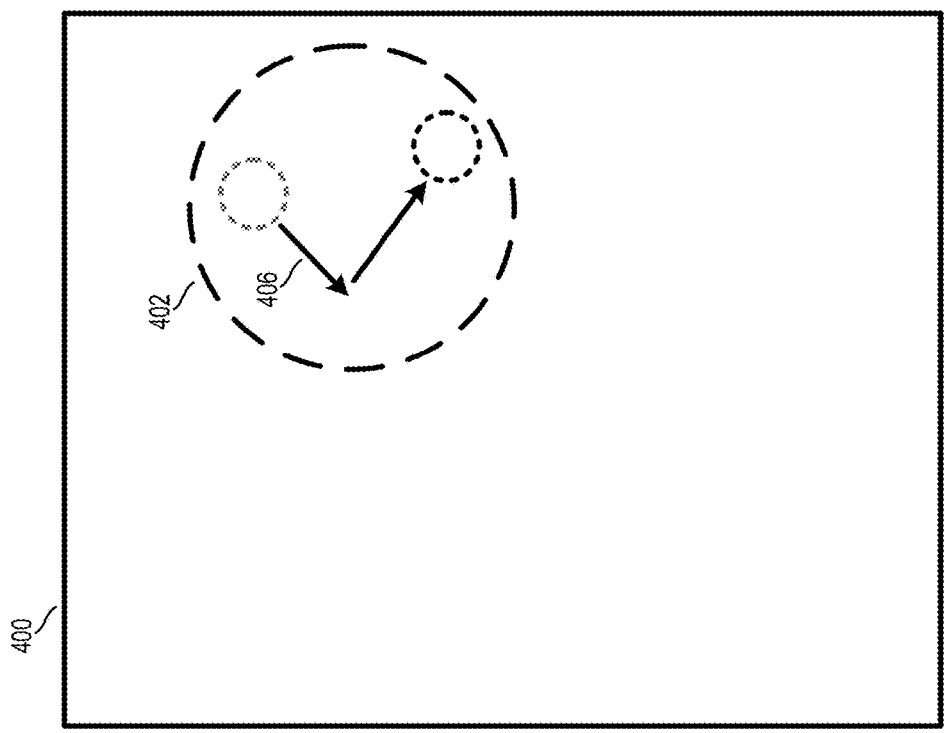

FIG. 4C illustrates the information system determining movement in depth sensor data and by the device, according to the example implementation. As indicated above, the information system may receive information from one or more devices operating in environment 400, which may include location information that indicates an approximate current location of a given device and/or movement information expressing recent movements of the device over a period of time. As shown, the information system may receive and analyze motion information from device 404 as represented in reference frame 408. Reference frame 408 corresponds to a reference frame that the IMU of device 404 may operate according, which may not initially align with a reference from of the sensors sending point cloud data to the information system. As such, the information system may manipulate incoming information from device 404 to align with point cloud data that corresponds to the same time period.

Figure 4D:
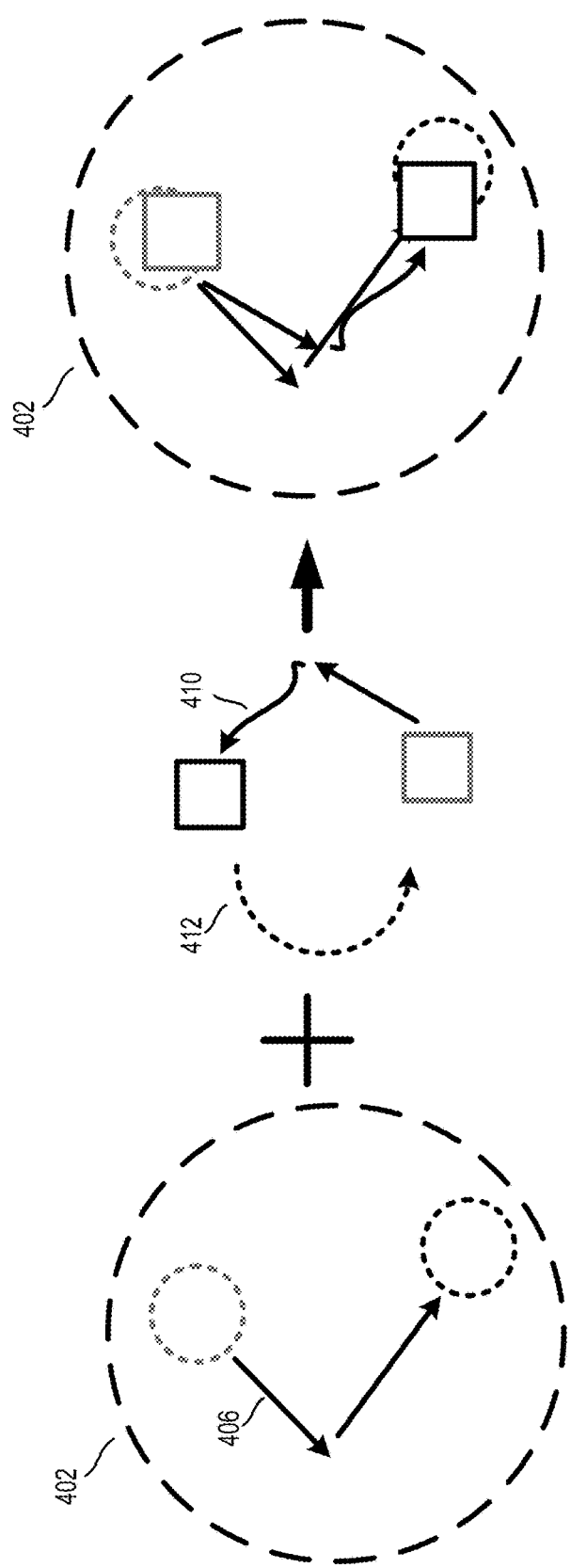
FIG. 4D illustrates the information system comparing the movement in the depth sensor data to the movement of the device, according to the example implementation.

FIG. 4D illustrates the information system comparing the movement in the depth sensor data to the movement of the device, according to the example implementation. The information system may use the movement information of device 404 to determine a portion of the point cloud data representing the cluster of potential actors 402 that displays movement that matches the movement of device 404 over the same period of time. As shown, the information system may align movement information from the device to assist in identifying a portion of the point cloud data that displays similar movement over the same time period. For instance, the information system may rotate 412 the movement information 410 of device 404. The information system may use this technique to focus upon a portion of the point cloud data representing the cluster of potential actors 402 to identify an actor that corresponds to device 404 (e.g., an actor that is holding device 404). The information system may compare changes in movement of the device compared to changes in movement of the potential actors within the depth sensor data during the same periods. Similarly, the information system may compare periods of rest and/or periods of acceleration or deceleration within the movement information of the device and within the depth sensor data.

FIG. 4E illustrates the information determining a portion of the point cloud data that likely corresponds to a particular actor using the device, according to the example implementation. As shown, the information system may determine a portion 414 of the point cloud data that likely corresponds to an actor displaying similar movements over a recent period of time that compares to movements of device 404. As a result, the information system may identify a particular actor within the portion 414 of the point cloud data.

In some instances, the information system may identify a particular actor within the portion 414 of the point cloud data based on gait characteristics of the particular actor. For instance, the information system may detect the particular actor based on the actor displaying similar acceleration patterns of movement during a period of time that the device is moving in like acceleration patterns. Similarly, the information system may identify the actor based on the actor displaying velocity movements over time that corresponds to velocity movements of the device during the same time.

Figure 5:
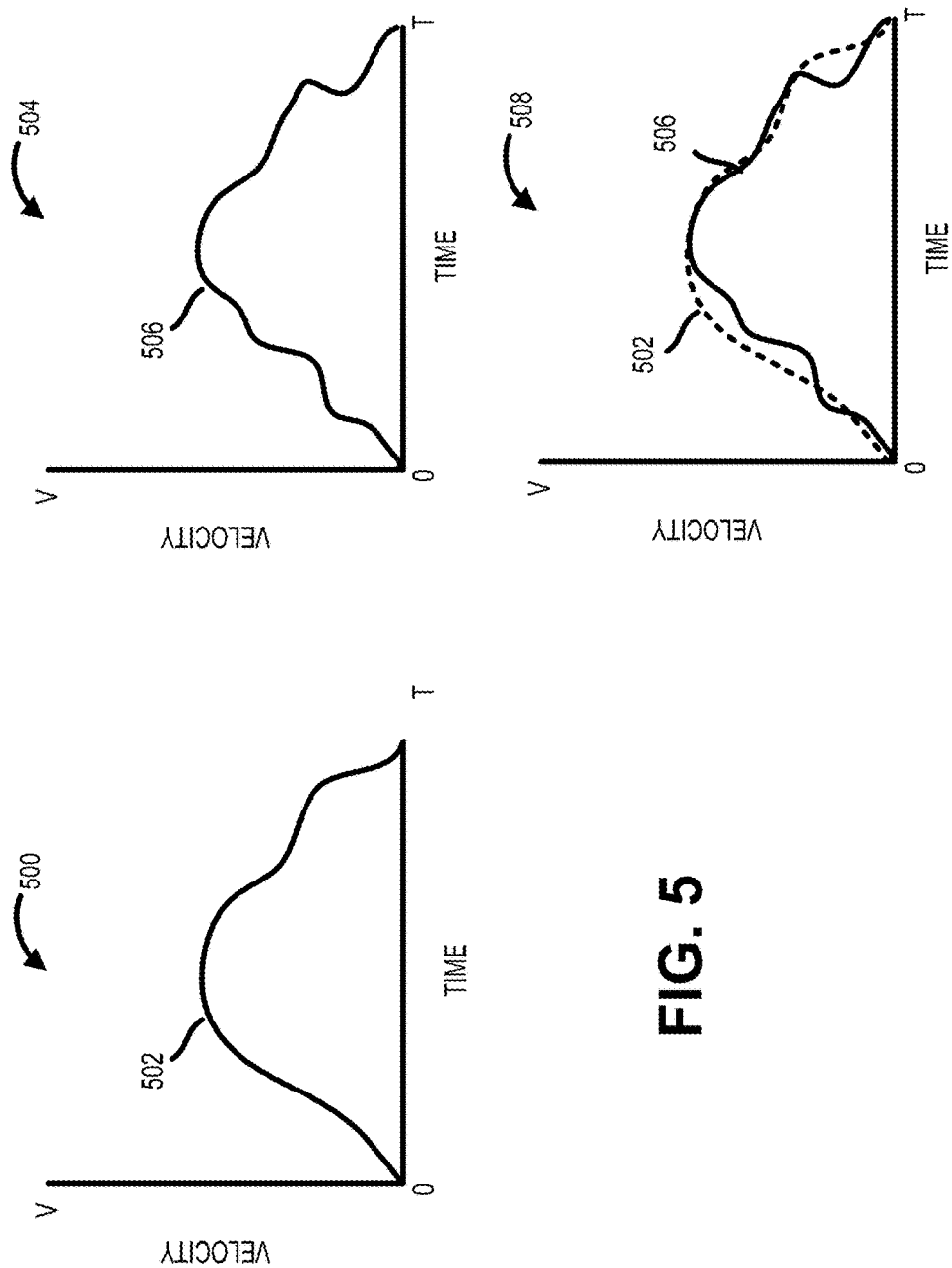
FIG. 5 illustrates graphs depicting an implementation of determining point cloud data indicative of an actor.

FIG. 5 illustrates graphs depicting an implementation of determining point cloud data indicative of an actor. In particular, FIG. 5 shows LIDAR data graph 500 that depicts velocity over time 502 (e.g., values of velocity) detected within a portion of point cloud data received at an information system, and device motion data graph 504 that depicts velocity over time 506 of a given device moving in the same environment. In addition, FIG. 5 also shows a combined graph 508 that illustrates similarities between velocity over time 502 represented in LIDAR data graph 500 and velocity over time 506 represented in device motion graph 506. Although the example graphs shown in FIG. 5 illustrate values of velocity over a period of time within point cloud data from LIDAR sensors and within movement information provided by a device (e.g., smartphone, wearable device), an information system may use other movement information when identifying a particular actor within the point cloud data associated with the device. For example, an information system may use changes in acceleration over time, changes in direction over time, and/or other representations of motion as measured within point cloud data from sensors and movement information from a device. In some instances, the information system may use a combination of motion information to determine points within incoming point cloud data that likely corresponds to an actor that is coupled to the device.

Furthermore, it is important to note that the graphs shown in FIG. 5 may serve as example illustrations of motion information that an information system may use to assist detecting a potential actor associated with the device. As such, the information system may perform comparisons without generating the graphs and other example graphs may illustrate other motion information that the information system may use.

LIDAR data graph 500 represents depth sensor data (e.g., point cloud data) that an information system may receive from one or more LIDAR units operating in an environment. In particular, LIDAR data graph 500 shows velocity over time 502 that represents changes in velocity over time that occurs in at least a portion of the point cloud data received at the information system. The size of the detected portion of the point cloud data may vary within examples. By way of an example, the information system may receive multiple point clouds over a given period of time that produces point cloud data that enables the information system to detect the changes in velocity over time 502 in order to generate LIDAR data graph 500. In other examples, LIDAR data graph 500 may illustrate other information within point cloud data that an information system may use to compare movements of potential actors within the point cloud data to movements of a device. For example, another LIDAR data graph may illustrate changes in direction and/or changes in acceleration of potential actors in the environment as depicted within point cloud data.

Device motion data graph 504 represents changes in velocity over time 506 in motion of a given device operating and changing locations within the environment. For instance, the information system may receive movement information from the device (e.g., smartphone, wearable computing device) that enables the information system to develop the device motion data graph 504. In the example graphs shown in FIG. 5, velocity over time 502 shown in LIDAR data graph 500 corresponds to the same time period as velocity over time 506 shown in device motion data graph 504. In other examples, device motion data graph 504 may illustrate other movement information provided by the device that an information system may use to determine a portion of the point cloud data that likely depicts an actor that corresponds to the device. For instance, device motion data graph 504 may illustrate changes in direction of the device over a period of time and/or changes in acceleration of the device.

In an example implementation, the information system may determine a portion of the incoming point cloud data that likely corresponds to motion that matches motion of the device based on comparing the motion state and/or changes in the motion state as depicted within received point cloud data and movement information from the device. For instance, the information system may compare changes in velocity of one or more potential actors depicted within point cloud data as represented by velocity over time 502 in LIDAR data graph 500 and changes in velocity of the device as represented by velocity over time 506 in device motion data graph 504.

An information system may identify a portion of incoming point cloud data that depicts an actor moving with changes in velocity over a time period that matches changes in velocity within movement of the device over the same time period. In particular, the information system may compare the changes in velocity (illustrated in comparison graph 508) to determine a portion of the point cloud that likely depicts an actor that is holding and/or otherwise coupled to the device. As shown in graph 508, the information system may determine that a portion of point cloud data likely depicts an actor having motion that is similar to movements of the device when the point cloud data represents that the potential actor displays similar motion (e.g., changes in velocity) over a period of time that matches the motion of the device over the same period of time. In some instances, the information system may be configured to estimate point cloud data that depicts an actor that likely is using the device and associate a probability (e.g., 80 percent) with that portion of point cloud data. In addition, the information system may increase the probability based on receiving additional sensor information and/or performing further comparison of movements within the point cloud data and motions of the device.

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

We claim:

1. A method comprising:
   receiving, at a computing system from at least one depth sensor positioned at at least one fixed position in an environment, at least one set of point cloud data representative of the environment;
   detecting, at the computing system using the at least one set of point cloud data, point cloud data corresponding to a cluster of one or more potential actors at a location in the environment;
   receiving, at the computing system, location information from a device;
   based on the location information from the device, determining that a current location of the device is proximate to the location of the cluster of one or more potential actors;
   receiving, at the computing system from the device, movement information indicative of movement of the device;
   based on the movement information, determining, at the computing system, a portion of the point cloud data indicative of movement that matches the movement of the device;
   identifying, using the determined portion of the point cloud data, a particular actor of the cluster of one or more potential actors that corresponds to the device, wherein the device is physically coupled to the particular actor; and
   providing an output signal indicating the portion of the point cloud data representative of the identified particular actor.

2. The method of claim 1, wherein the at least one depth sensor is a LIDAR sensor.

3. The method of claim 1, wherein the point cloud data corresponding to the cluster of one or more potential actors corresponds to a merged point cloud generated from a plurality of point clouds received from a plurality of sensors.

4. The method of claim 1, wherein the location information from the device includes sensor data from a global positioning system (GPS) of the device indicating that the current location of the device is within a threshold distance from the location of the cluster of one or more potential actors.

5. The method of claim 1, wherein the location information from the device is based on a Wi-Fi based positioning system (WPS) operating in the environment.

6. The method of claim 1, wherein the device corresponds to a wearable computing device.

7. The method of claim 1, wherein the device corresponds to a security badge.

8. The method of claim 1, wherein based on the movement information, determining the portion of the point cloud data indicative of movement that matches the movement of the device comprises:
   identifying the portion of the point cloud data based on the portion of the point cloud data displaying rates of movement that match given rates of movement of the device.

9. The method of claim 1, wherein based on the movement information, determining the portion of the point cloud data indicative of movement that matches the movement of the device comprises:
   identifying the portion of the point cloud data based on the portion of the point cloud data displaying sequences of changing directions over a period of time that matches sequences of changing direction over the period of time by the device.

10. The method of claim 1, wherein receiving, at the computing system from the device, movement information indicative of movement of the device comprises:
   receiving the movement information from an inertial measurement unit (IMU) of the device.

11. The method of claim 1, wherein identifying, using the determined portion of the point cloud data, the particular actor of the cluster of one or more potential actors that corresponds to the device comprises:
   identifying the particular actor of the cluster of one or more potential actors based on a gait characteristics of the particular actor matching the movement information indicative of movement of the device.

12. A system comprising:
   one or more processors; and
   a non-transitory computer-readable medium, configured to store instructions, that when executed by the one or more processors, cause the computing system to perform functions comprising:
      receiving, from at least one depth sensor positioned at at least one fixed position in an environment, at least one set of point cloud data representative of the environment;
      detecting, using the at least one set of point cloud data, point cloud data corresponding to a cluster of one or more potential actors at a location in the environment;
      receiving location information from a device;
      based on the location information from the device, determining that a current location of the device is proximate to the location of the cluster of one or more potential actors;
      receiving, from the device, movement information indicative of movement of the device;
      based on the movement information, determining a portion of the point cloud data indicative of movement that matches the movement of the device;
      identifying, using the determined portion of the point cloud data, a particular actor of the cluster of one or more potential actors that corresponds to the device, wherein the device is physically coupled to the particular actor; and
      providing an output signal indicating the portion of the point cloud data representative of the identified particular actor.

13. The system of claim 12, wherein providing the output signal indicating the portion of the point cloud data representative of the identified particular actor further comprises:
   providing instructions to an audio system to provide audio in locations that correspond to respective locations of the identified particular actor.

14. The system of claim 12, wherein identifying, using the determined portion of the point cloud data, the particular actor of the cluster of one or more potential actors that corresponds to the device comprises:
   determining a rate of movement of at least one actor of the cluster of one or more potential actors;
   performing a comparison between the rate of movement of the at least one actor and a rate of movement of the device; and
   based on the comparison, identifying the particular actor that corresponds to the device.

15. The system of claim 12, wherein identifying, using the determined portion of the point cloud data, the particular actor of the cluster of one or more potential actors that corresponds to the device comprises:
   identifying the particular actor based on the particular actor moving with acceleration over a period of time that matches acceleration in the movement information of the device over the period of time.

16. The system of claim 12, wherein providing the output signal indicating the portion of the point cloud data representative of the identified particular actor further comprises:
   providing instructions to one or more robotic devices to operate away from respective locations of the identified particular actor.

17. A non-transitory computer-readable medium configured to store instructions, that when executed by one or more processors, cause a computing system to perform functions comprising:
   receiving, from at least one depth sensor positioned at at least one fixed position in an environment, at least one set of point cloud data representative of the environment;
   detecting, using the at least one set of point cloud data, point cloud data corresponding to a cluster of one or more potential actors at a location in the environment;
   receiving location information from a device;
   based on the location information from the device, determining that a current location of the device is proximate to the location of the cluster of one or more potential actors;
   receiving, from the device, movement information indicative of movement of the device;
   based on the movement information, determining a portion of the point cloud data indicative of movement that matches the movement of the device;
   identifying, using the determined portion of the point cloud data, a particular actor of the cluster of one or more potential actors that corresponds to the device, wherein the device is physically coupled to the particular actor; and
   providing an output signal indicating the portion of the point cloud data representative of the identified particular actor.

18. The non-transitory computer-readable medium of claim 17, further comprising:
   based on identifying the particular actor of the cluster of one or more potential actors, providing instructions to one or more systems to adjust one or more aspects of the environment as the particular actor changes location in the environment.

19. The non-transitory computer-readable medium of claim 17, further comprising:
   receiving location information from a second device;
   based on the location information from the second device, determining that a current location of the second device is proximate to the location of the cluster of one or more potential actors;
   receiving, from the second device, movement information indicative of movement of the second device;
   based on the movement information from the second device, determining a second portion of the point cloud data indicative of movement that matches the movement of the second device; and
   identifying, using the determined second portion of the point cloud data, a second actor of the cluster of one or more potential actors that corresponds to the second device.

20. The non-transitory computer-readable medium of claim 19, further comprising:

providing instructions to one or more systems operating in the environment to perform operations based on identifying the particular actor and the second actor.

\* \* \* \* \*